United States Patent [19]
Oda

[11] Patent Number: 6,055,881
[45] Date of Patent: May 2, 2000

[54] COLUMN SHIFT DEVICE FOR AUTOMATIC TRANSMISSION

[75] Inventor: Shigeaki Oda, Shizuoka, Japan

[73] Assignee: Kabushiki Kaisha Atsumitec, Shizuoka, Japan

[21] Appl. No.: 09/219,858

[22] Filed: Dec. 23, 1998

[30] Foreign Application Priority Data

Dec. 26, 1997 [JP] Japan ..................................... 9-360038

[51] Int. Cl.⁷ .................................................. B60K 20/06
[52] U.S. Cl. ..................................... 74/473.31; 74/473.32; 74/473.34
[58] Field of Search ........................... 74/473.31, 473.32, 74/473.34, 473.3, 471 R, 473.1

[56] References Cited

U.S. PATENT DOCUMENTS

| | | | |
|---|---|---|---|
| 2,905,016 | 9/1959 | Gorsky | 74/475 |
| 3,768,330 | 10/1973 | Gejoff | 74/484 |
| 4,733,573 | 3/1988 | Kramer | 74/473 SW |
| 5,146,805 | 9/1992 | Harkrader et al. | 74/473 SW |

FOREIGN PATENT DOCUMENTS 8-282317  10/1996  Japan .

*Primary Examiner*—David M. Fenstermacher
*Attorney, Agent, or Firm*—Armstrong, Westerman, Hattori, McLeland & Naughton

[57] ABSTRACT

A column shift device for an automatic transmission includes a bracket, and a shift piece turnably connected to the bracket through a first pivot. A shift lever is turnably connected to the shift piece through a second pivot located on a plane substantially perpendicular to the first pivot. A shift link is pivoted on the bracket for operation in association with the turning movement of the shift lever about the first pivot to control the automatic transmission. In the device, a spherical joint member is slidably fitted over an outer periphery of an arm shaft fixedly provided on the shift piece and is slidably engaged in a rectilinear guide groove defined in a shift link. When the shift piece is turned about the first pivot, the joint member is moved rectilinearly along the guide groove. Thus, even if the turning angle of the arm shaft is constant, the turning stroke provided to the shift link by the joint member can be increased.

2 Claims, 14 Drawing Sheets

WHEN LOCKING IS
FORCIBLY RELEASED

COLUMN SHIFT DEVICE FOR AUTOMATIC TRANSMISSION

BACKGROUND OF THE INVENTION

1. Field of the Invention

The present invention relates to a column shift device for an automatic transmission, and particularly, to an improvement in a column shift device for an automatic transmission, including a bracket mounted to a steering column, a shift piece connected to the bracket through a first pivot for turning movement to any of a plurality of shift positions, a shift lever which is connected to the shift piece through a second pivot disposed on a plane substantially perpendicular to the first pivot and which is capable of turning the shift piece through the second pivot, a shift restraining mechanism which is provided on the bracket for engagement and disengagement permitted in response to a swinging movement of the shift lever about the second pivot and adapted to restrain a turning movement of the shift lever about the first pivot during engagement of the shift restraining mechanism, and a shift link which is carried on the bracket for swinging movement and is operated in association with the turning movement of the shift lever about the first pivot to control the automatic transmission.

2. Description of the Related Art

In a conventional column shift device of this type, when the shift lever and the shift link are operatively connected to each other, a joint member is oscillatably mounted at a tip end of an arm shaft projectingly provided on the shift piece, the joint member being put into engagement in a radial guide groove defined in the shift link for sliding movement in longitudinal and depth-wise directions of the groove(for example, see Japanese Patent Application Laid-open No. 8-282317).

In such a conventional column shift device, the joint member is secured to the tip end of the arm shaft and hence, if the arm shaft is turned through an angle θ, as shown in FIG. 15, the joint member provides the turning movement of the shift link while describing a locus of an arc a. Therefore, the turning stroke provided to the shift link by the joint member, i.e., the shift stroke of a manual valve of the automatic transmission is equal to the length $S_1$ of a chord of the arc a. Thereupon, when the turning stroke of the shift link is increased, the turning angle θ of the arm shaft is obliged to be increased. However, such an increase is limited to a certain extent for ensuring a good manipulatability.

SUMMARY OF THE INVENTION

Accordingly, it is an object of the present invention to provide a column shift device of the above-described type, wherein even if the turning angle of the arm shaft is constant, the turning angle applied to the shift link of the joint member can be increased to provide a large shift stroke to the manual valve of the automatic transmission.

To achieve the above object, according to a first aspect and feature of the present invention, there is provided a column shift device for an automatic transmission, comprising a bracket mounted to a steering column, a shift piece connected to the bracket through a first pivot for turning movement to any of a plurality of shift positions, a shift lever which is connected to the shift piece through a second pivot disposed on a plane substantially perpendicular to the first pivot and which is capable of turning the shift piece through the second pivot, a shift restraining mechanism which is provided on the bracket for engagement and disengagement permitted in response to a swinging movement of the shift lever about the second pivot and adapted to limit a turning movement of the shift lever about the first pivot during engagement of the shift restraining mechanism, and a shift link which is pivoted on the bracket for swinging movement and is operated in association with the turning movement of the shift lever about the first pivot to control the automatic transmission, wherein the column shift device further includes a spherical joint member slidably fitted over an outer periphery of an arm shaft which is fixedly mounted on the shift piece and protrudes outwards of the shift piece, the joint member being slidably put into engagement in a guide groove which is defined in the shift link and extends rectilinearly in a direction intersecting a direction of turning movement of the arm shaft about the first pivot.

With such first feature, the spherical joint member is slidably fitted over the arm shaft and is in engagement in the rectilinear guide groove in the shift link. Therefore, when the arm shaft is turned about the first pivot, the joint member can be slid on the arm shaft and at the same time, moved rectilinearly along the guide groove to provide a large turning stroke to the shift link. Therefore, the automatic transmission can be precisely operated, or when the turning stroke of the shift link is set at the same value as in the conventional device, the angle of turning of the arm shaft about the first pivot, i.e., the angle of turning of the shift lever about the first pivot can be set smaller than the angle of turning in the conventional device to enhance the operability.

According to a second aspect and feature of the present invention, in addition to the above first feature, the joint member has a shaft bore provided therein, into which shaft bore the arm shaft is slidably fitted, and chamfered portions provided on opposite sides of the joint member, into which chamfered portions the shaft bore opens, a distance between both the chamfered portions being set slightly smaller than a groove width of the guide groove.

With the second feature, at the time of assembling the column shift device, the joint member is inserted in a single state into the guide groove, while the chamfered portions thereof are turned toward the bottom of the guide groove in the shift link. Then, the joint member is turned through approximately 90° within the guide groove so as to direct the chamfered portions toward an opened surface of the guide groove, whereby the spherical portion is mated to the bottom of the guide groove. Thereafter, the arm shaft is fitted into the shaft bore in the joint member. Thus, the returning of the joint member through an angle provided at the insertion thereof is restricted by the arm shaft and hence, it is possible to prevent the leaving or disengagement of the joint member from the guide groove without use of a special removal-preventing member.

The above and other objects, features and advantages of the invention will become apparent from the following description of the preferred embodiment taken in conjunction with the accompanying drawings.

DETAILED DESCRIPTION OF THE PREFERRED EMBODIMENTS

The present invention will now be described by way of an embodiment with reference to the accompanying drawings.

Figure 4:
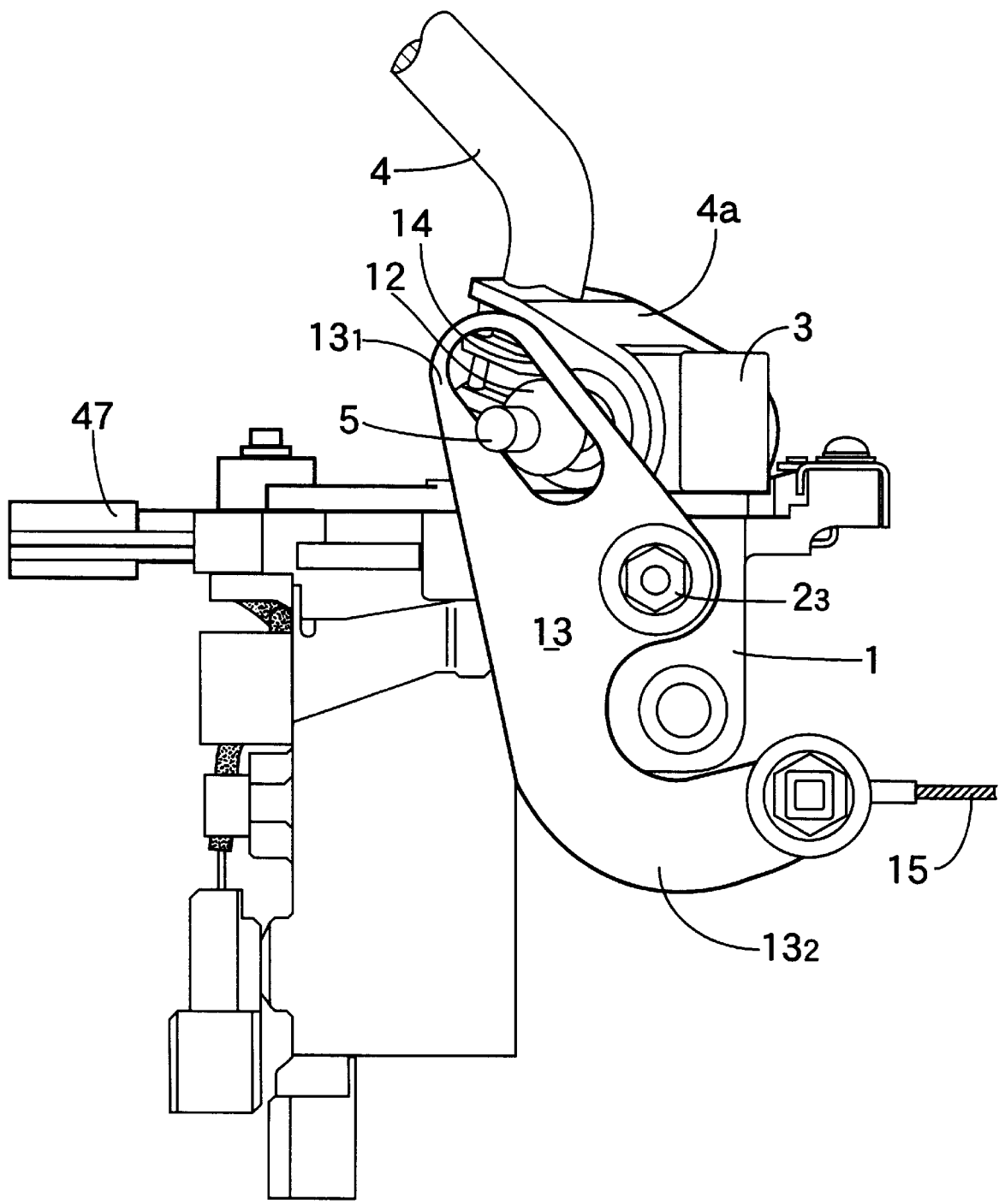
FIG. 4 is a view (a bottom view) taken in the direction of an arrow 4 in FIG. 1.
Figure 5:
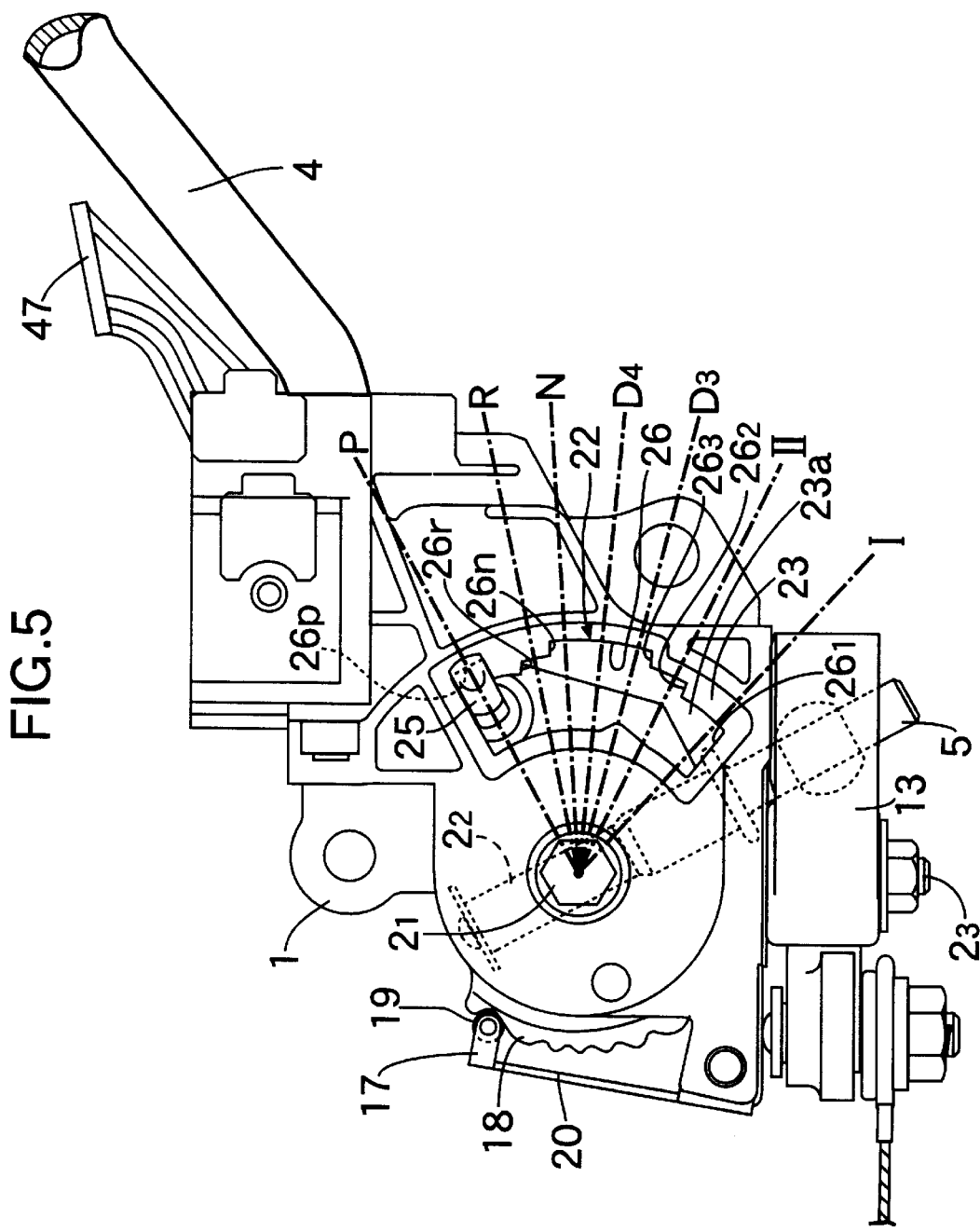
FIG. 5 is a view (a left side view) taken in the direction of an arrow 5 in FIG. 3.
Figure 6:
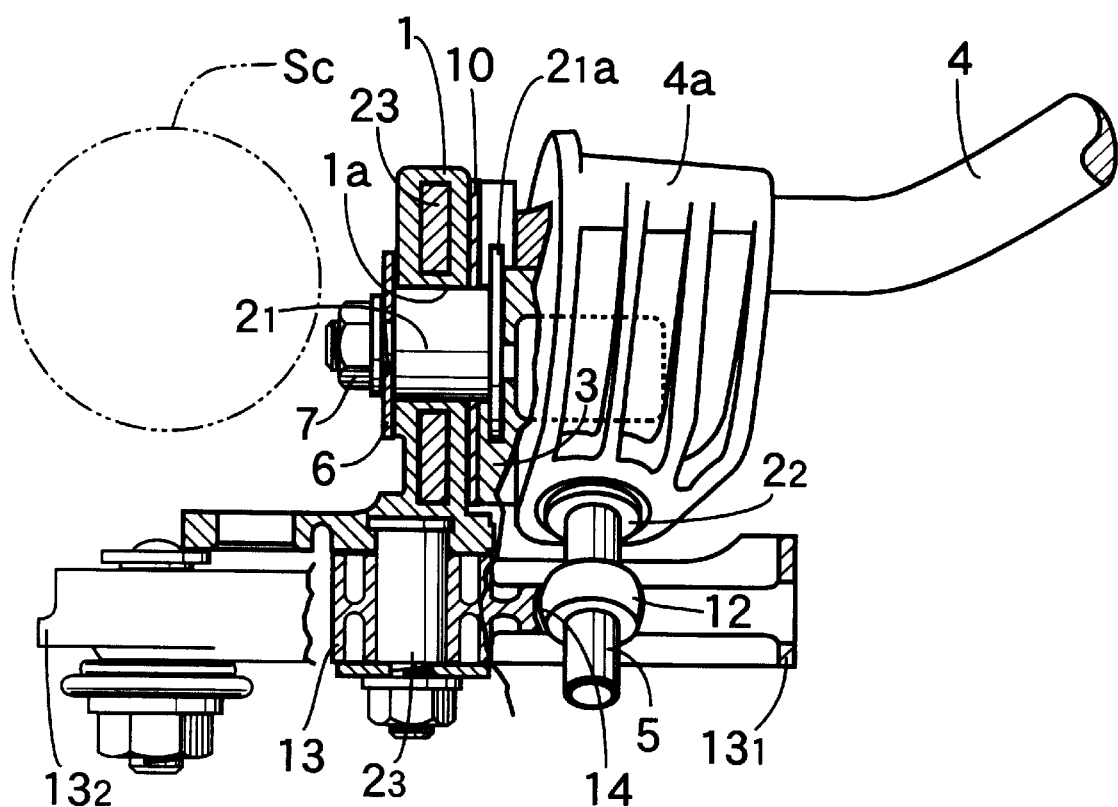
FIG. 6 is a view taken in the direction of an arrow 6—6 in FIG. 1.
Figure 7:
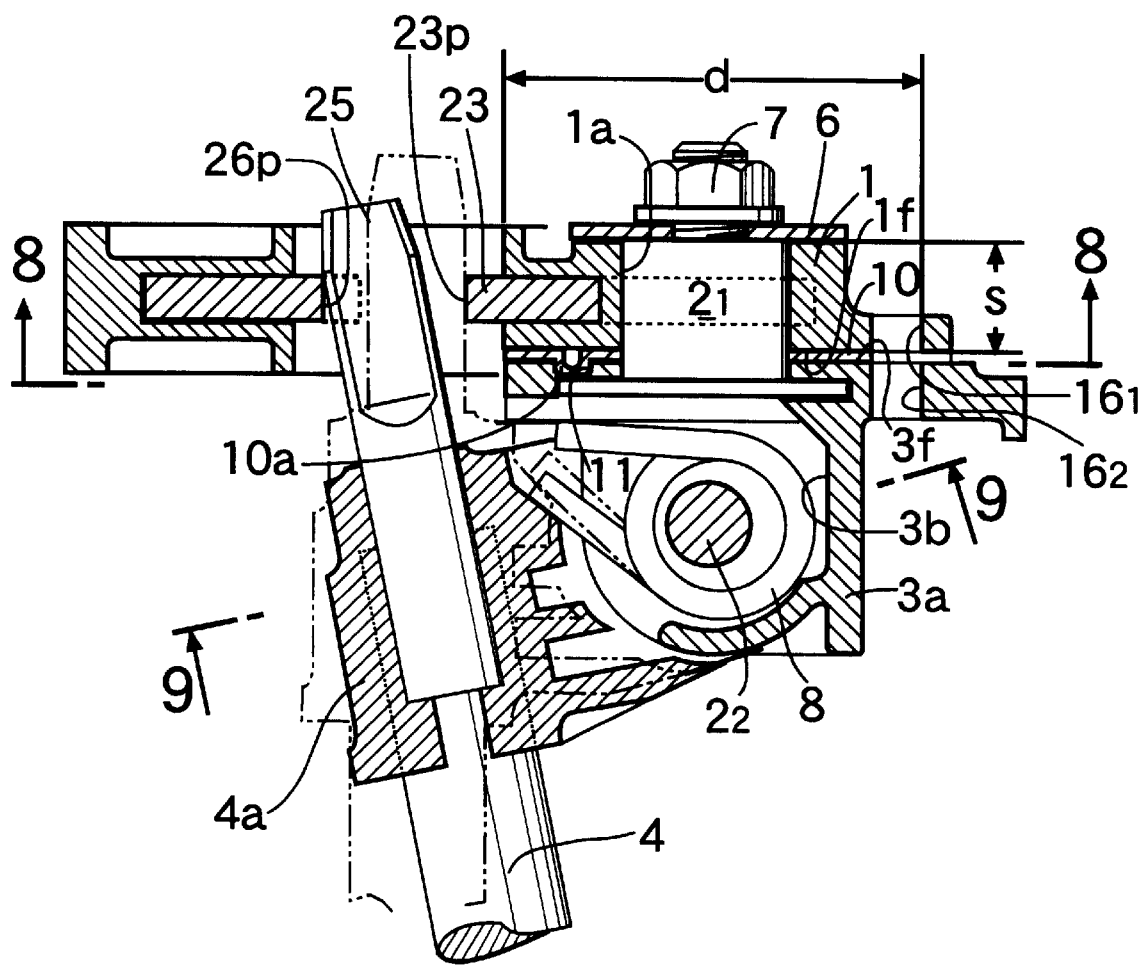
FIG. 7 is a sectional view taken along a line 7—7 in FIG. 1.

Referring first to FIGS. 1 to 7, a column shift device includes a bracket 1 made of a synthetic resin and secured to a steering column Sc adjacent a steering wheel Sw of an automobile. As shown in FIGS. 6 and 7, a support bore 1$a$ having an axis extending a lateral direction of a vehicle is provided in the bracket 1, and a shift piece 3 made of a synthetic resin is turnably connected to the bracket 1 through a first pivot $2_1$ fitted in the support bore 1$a$. A base end of the first pivot $2_1$ which has an anchor flange $2_1 a$ is coupled by molding to the shift piece 3, and a slip-off preventing plate 6 is secured to a tip end of the first pivot $2_1$ by a nut 7 to abut against an outer end face of the bracket 1.

Figure 8:
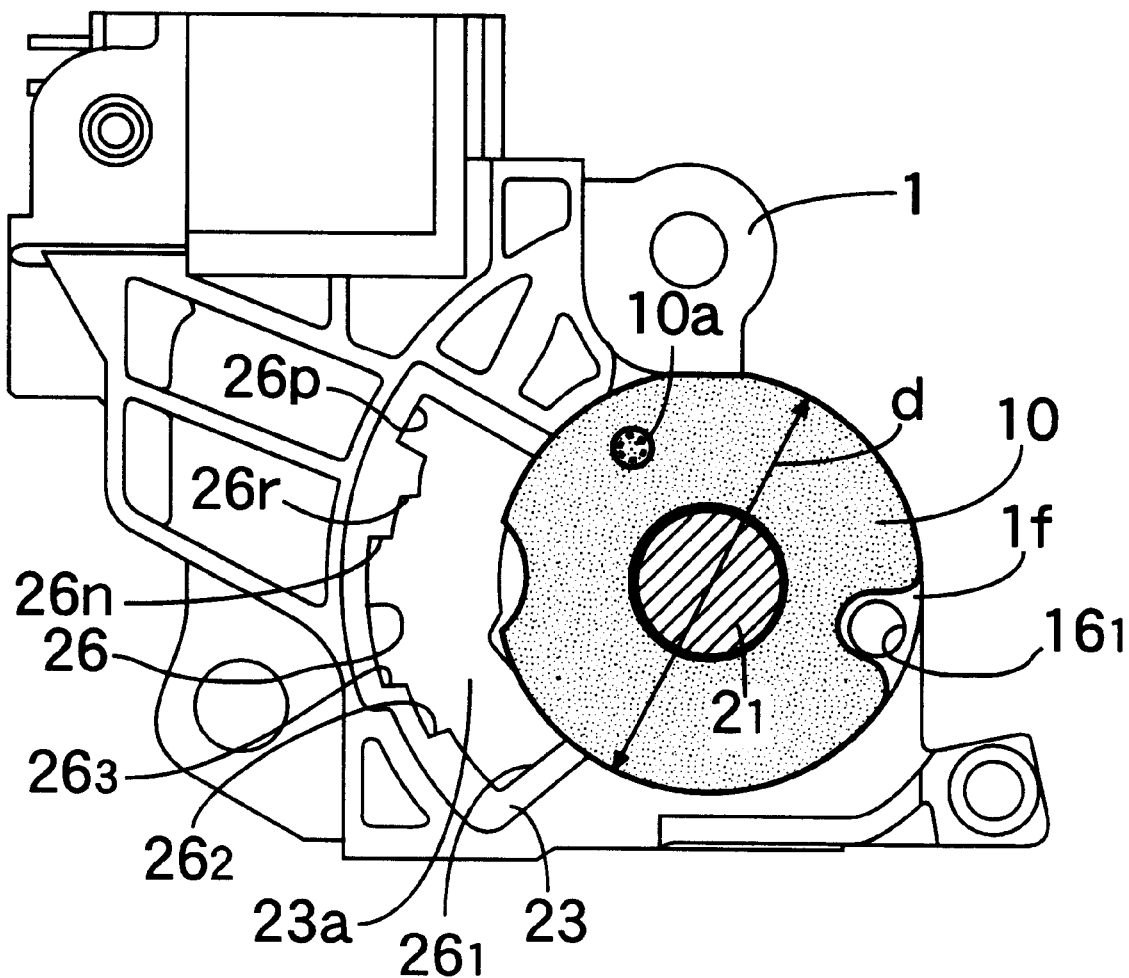
FIG. 8 is a sectional view taken along a line 8—8 in FIG. 7.
Figure 9:
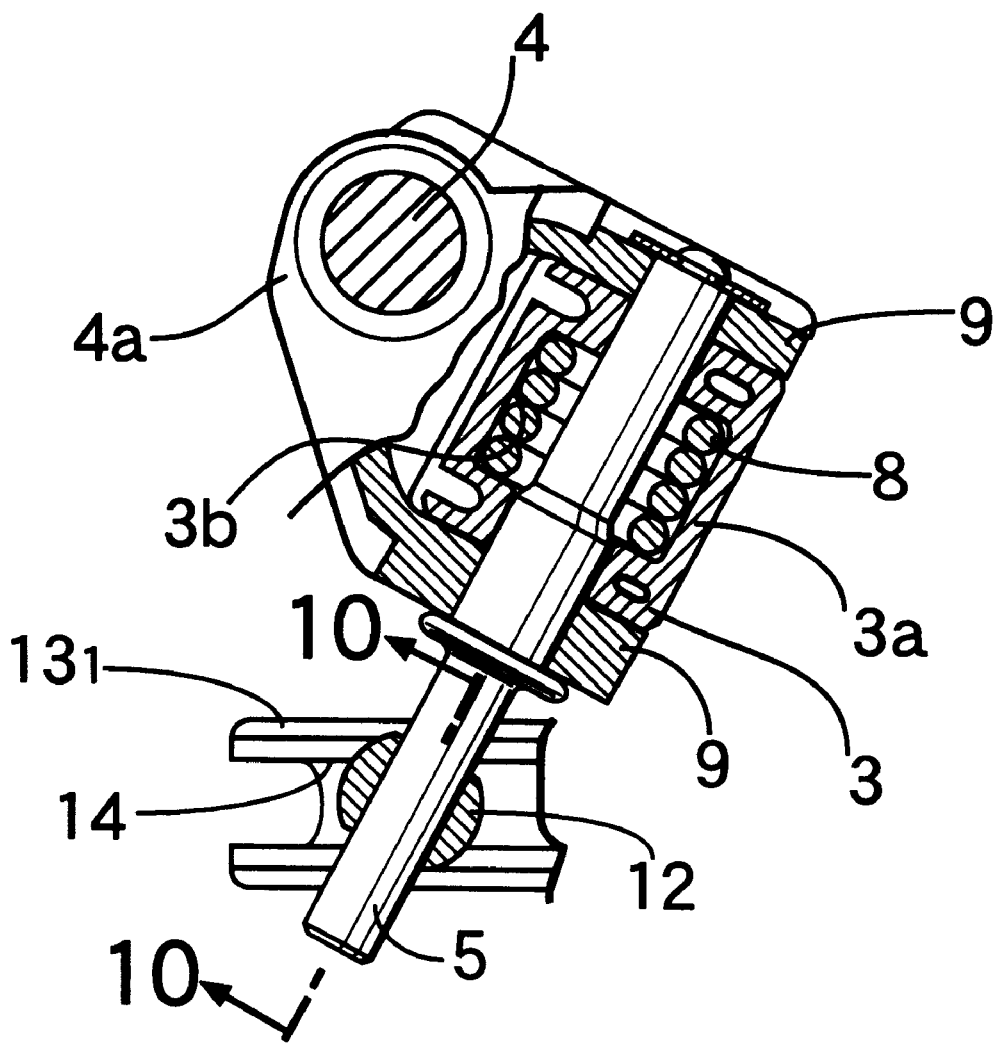
FIG. 9 is a sectional view taken along a line 9—9 in FIG. 7.
Figure 10:
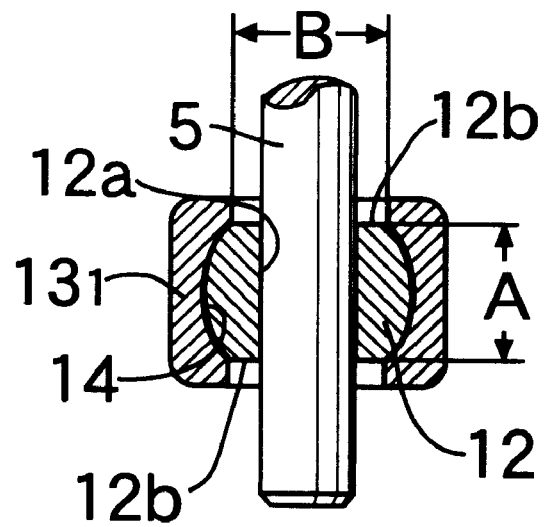
FIG. 10 is a sectional view taken along a line 10—10 in FIG. 9.

As shown in FIGS. 7 and 8, turnable/slidable surfaces 1$f$ and 3$f$ having a diameter d several times an effective length s of the first pivot $2_1$ are formed respectively on opposed surfaces of the bracket 1 and the shift piece 3 which are opposed to each other in an axial direction of the first pivot $2_1$. These surfaces are adapted to be turned and slid with a thrust plate 10 interposed therebetween. The thrust plate 10 is formed of a material having a low friction coefficient such as an acetal resin. A positioning projection 10$a$ is formed on the thrust plate 10 and fitted into a positioning bore 11 which is provided in either one of the bracket 1 and the shift piece 3 (in the shift piece 3 in the illustrated embodiment). Therefore, in the illustrated embodiment, when the bracket 1 and the shift piece 3 are rotated relative to each other, the turning and sliding movements are produced between the thrust plate 10 and the turnable/slidable surface 1$f$ of the bracket 1.

The bracket 1 and the shift piece 3 are provided with tool bores $16_1$ and $16_2$ parallel to the first pivot $2_1$, respectively. The tool bores $16_1$ and $16_2$ are matched with each other at a neutral position N of the shift piece 3 which will be described hereinafter. If a suitable tool is inserted into the tool bores $16_1$ and $16_2$ at the neutral position N, the relative rotation of the bracket 1 and the shift piece 3 can be restricted to conduce to the convenience for the transportation and assembling of the column shift device.

Figure 1:
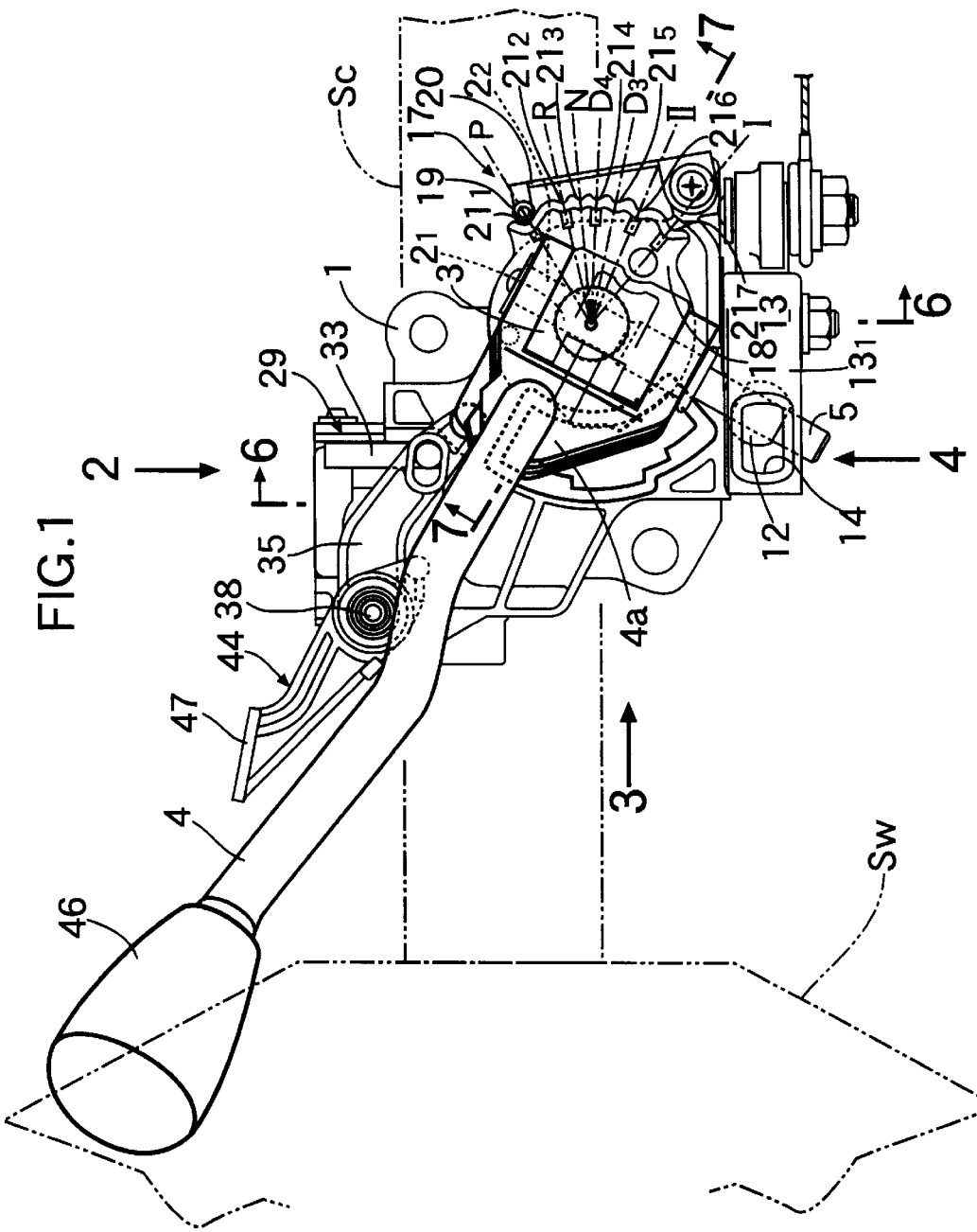
FIG. 1 is a right side view of a column shift device for an automatic transmission.
Figure 2:
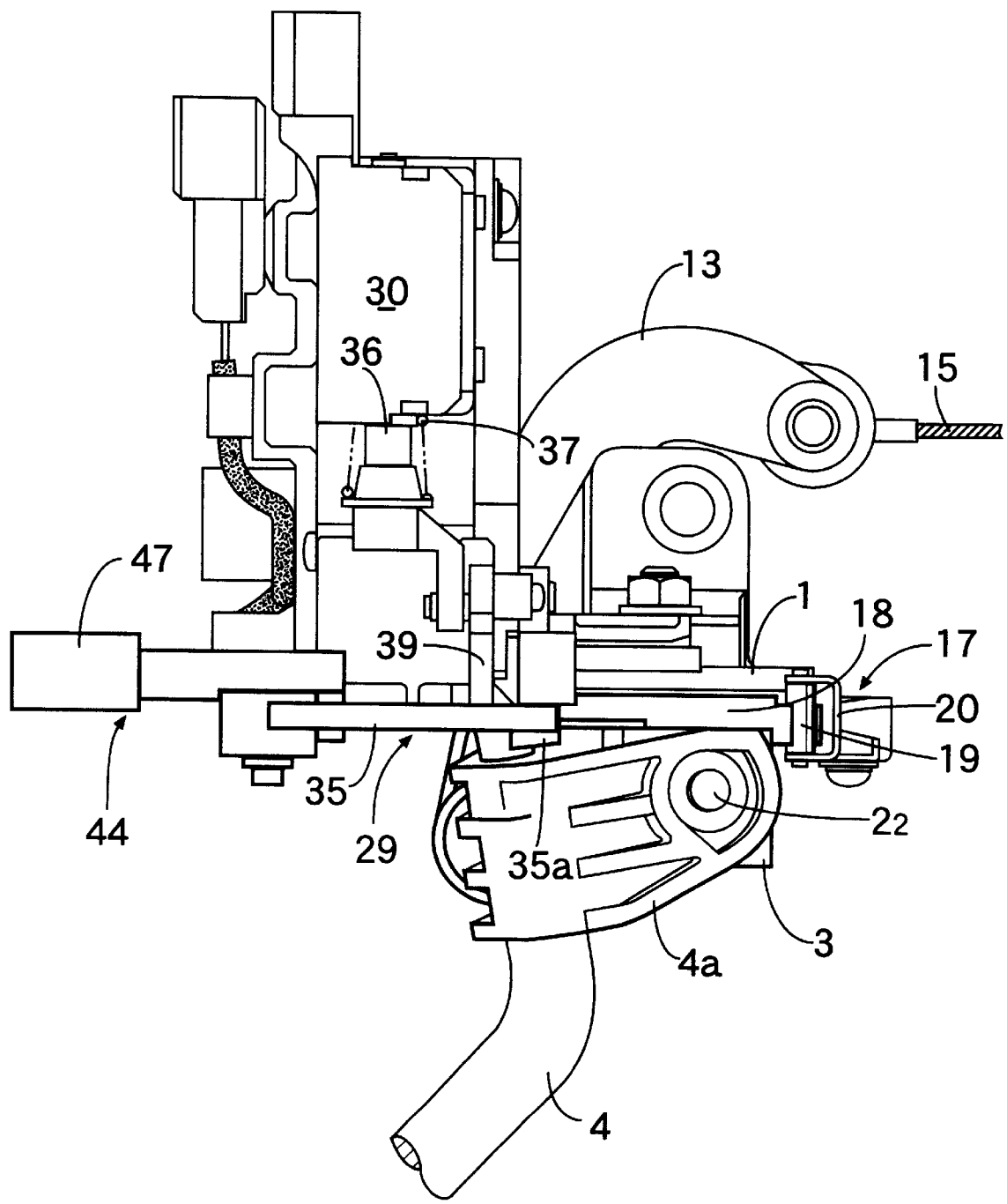
FIG. 2 is a view (a plan view) taken in the direction of an arrow 2 in FIG. 1.
Figure 3:
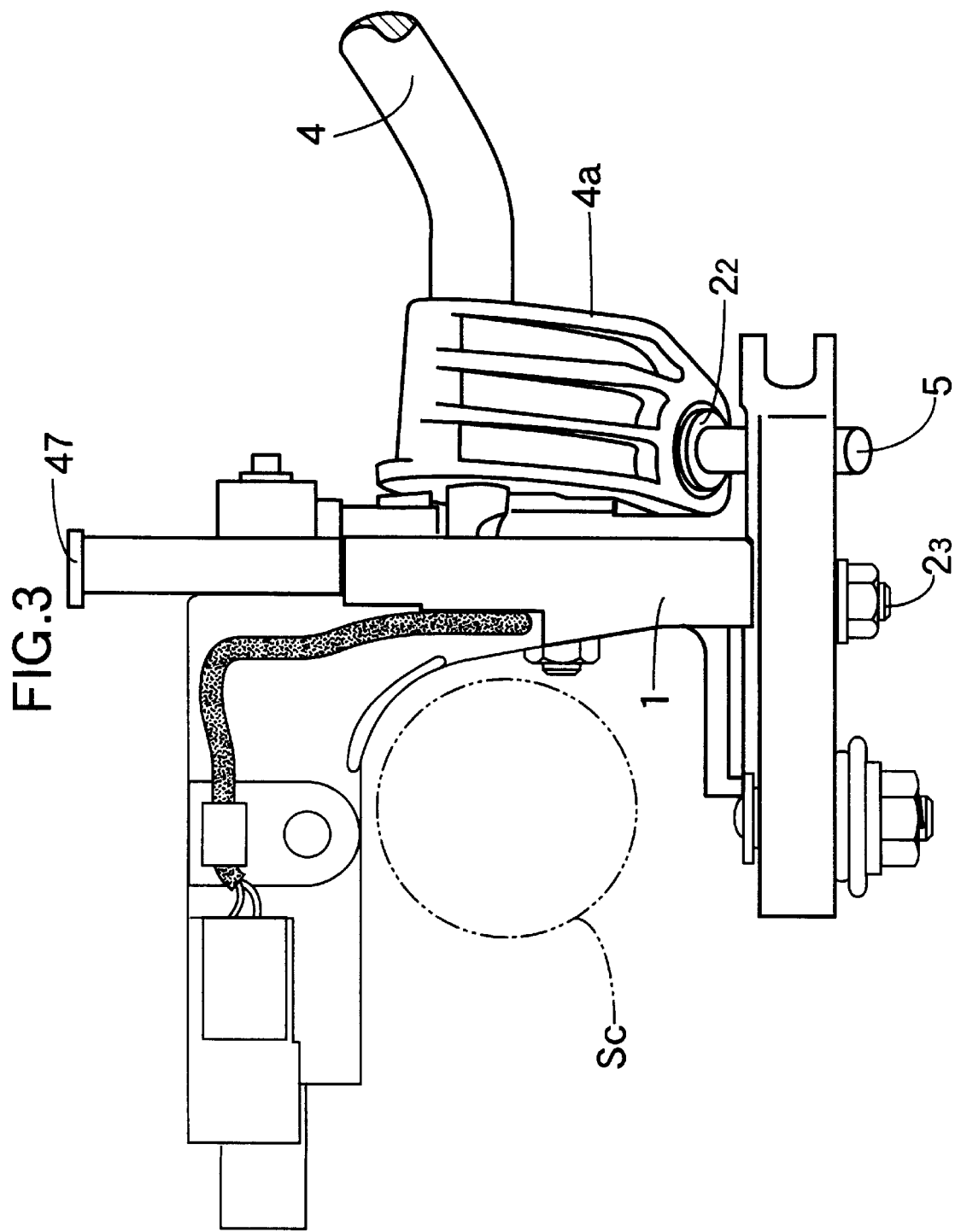
FIG. 3 is a view (a front view) taken in the direction of an arrow 3 in FIG. 1.

As shown in FIGS. 1, 6 and 7, the shift piece 3 is integrally provided with a boss 3$a$ which protrudes in a direction opposite from the first pivot $2_1$, and a boss member 4$a$ at a base portion of a shift lever 4 is turnably connected to the boss 3$a$ through a second pivot $2_2$ which is disposed in a plane adjacent and substantially perpendicular to the axis of the first pivot $2_1$. The boss member 4$a$, which is made of a synthetic resin, is coupled in a molded manner to the base portion of the shift lever 4 and integrally provided with a pair of support arms 9 opposed to each other with the boss 3$a$ of the shift piece 3 interposed therebetween. The support arms 9 fixedly support the second pivot $2_2$ extending through the shift piece 3. The shift lever 4 has a knob 4$b$ provided at its tip end.

A recess 3$b$ is defined in one side of the boss 3$a$ of the shift piece 3. A coiled portion of a set spring 8 comprising a torsion coil spring mounted on the second pivot $2_2$ is accommodated in the recess 3$b$ and locked at its opposite ends in the shift piece 3 and the boss member 4$a$, respectively. Thus, the shift lever 4 is biased in a given direction around the second pivot $2_2$. The biasing direction will be described hereinafter.

As shown in FIGS. 1, 6, 7, 9 and 10, the second pivot $2_2$ is integrally provided with an arm shaft 5 which protrudes outwards over a long length from one of the support arms 9 of the boss member 4$a$. A spherical joint member 12 made of a synthetic resin is slidably fitted over an outer peripheral surface of the arm shaft 5. On the other hand, a shift link 13 having first and second arms $13_1$ and $13_2$ are swingably supported on a lower surface of the bracket 1 through a third pivot $2_3$. A guide groove 14 is defined in the first arm $13_1$ and extends rectilinearly in a direction intersecting a direction of turning movement of the first arm $13_1$ about the first pivot $2_1$. The guide groove 14 opens into opposite surfaces of the first arm $13_1$ and is arcuate in section, and the joint member 12 is slidably engaged in the guide groove 14. The joint member 12 has chamfered portions 12$b$ formed on its opposite sides into which an axial bore 12$a$ with the arm shaft 5 slidably fitted therein opens. The distance A between the chamfered portions 12$b$ is set slightly smaller than the width B of the guide groove 14.

Figure 11:
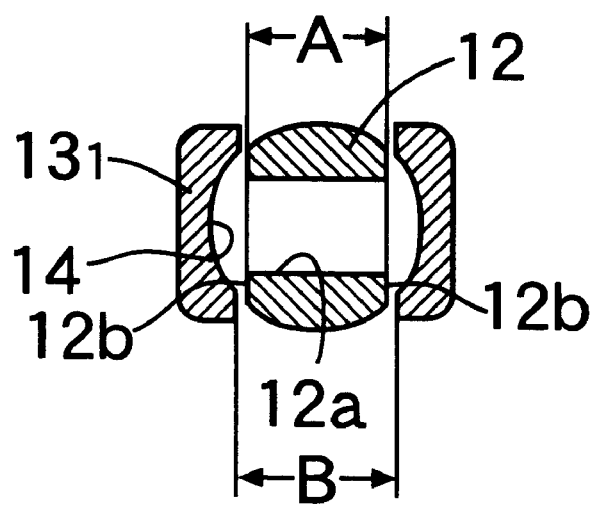
FIG. 11 is a view similar to FIG. 10 for explaining the operation.
Figure 12:
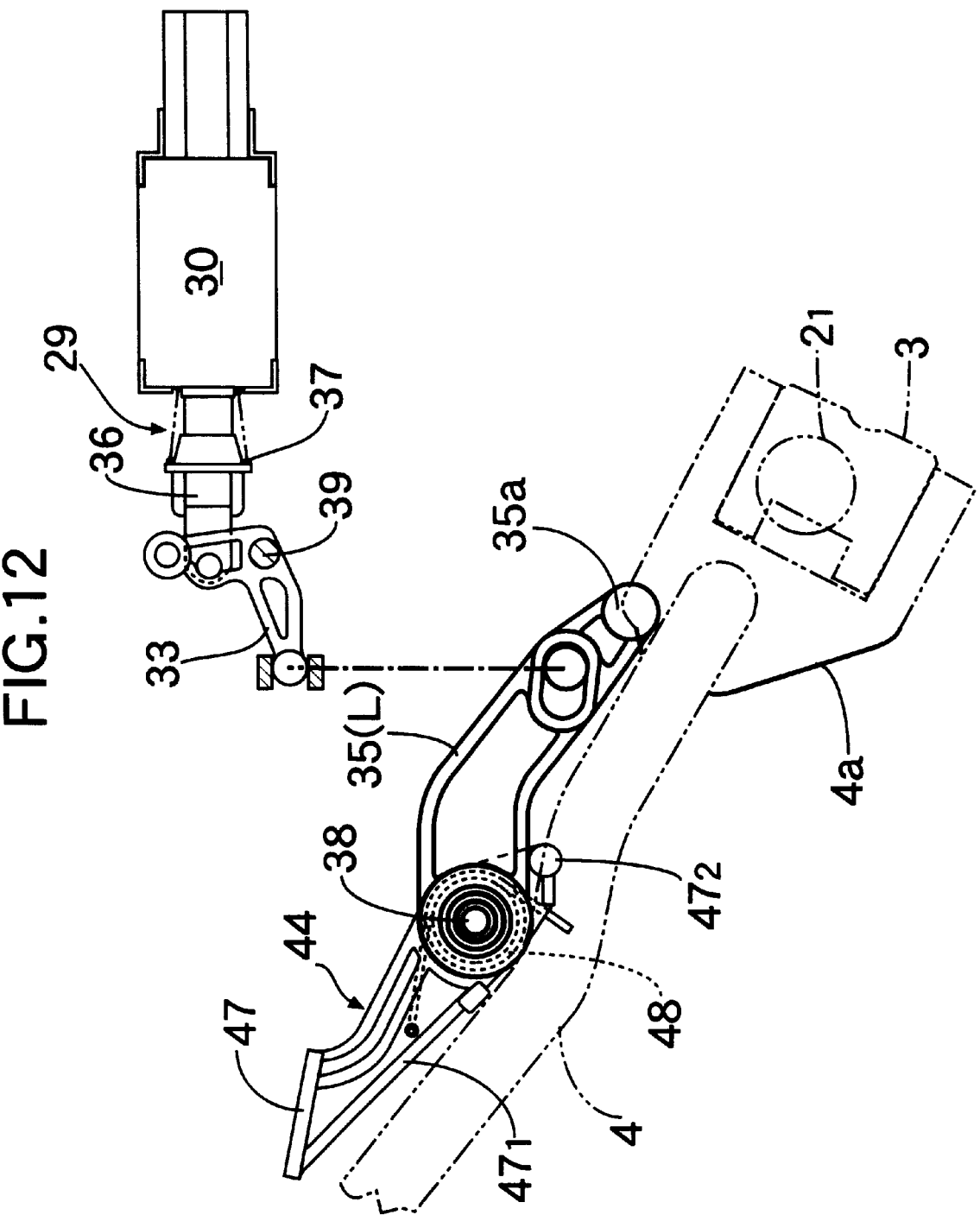
FIG. 12 is an exploded view of a shift lock device and a forcibly lock-releasing mechanism.
Figure 13:
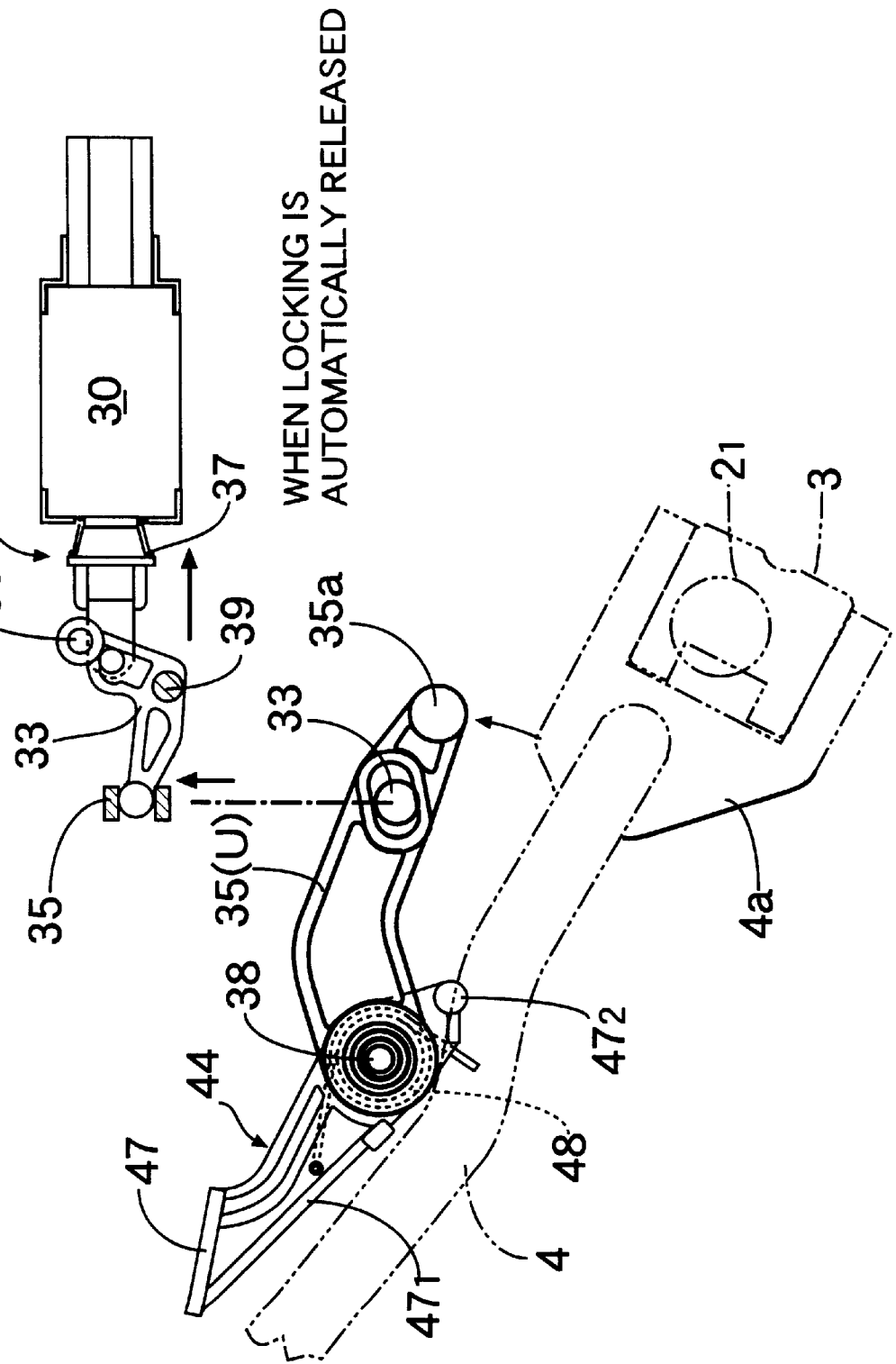
FIGS. 13 and 14 are views for explaining the operations of the shift lock device and the forcibly lock-releasing mechanism.
Figure 14:
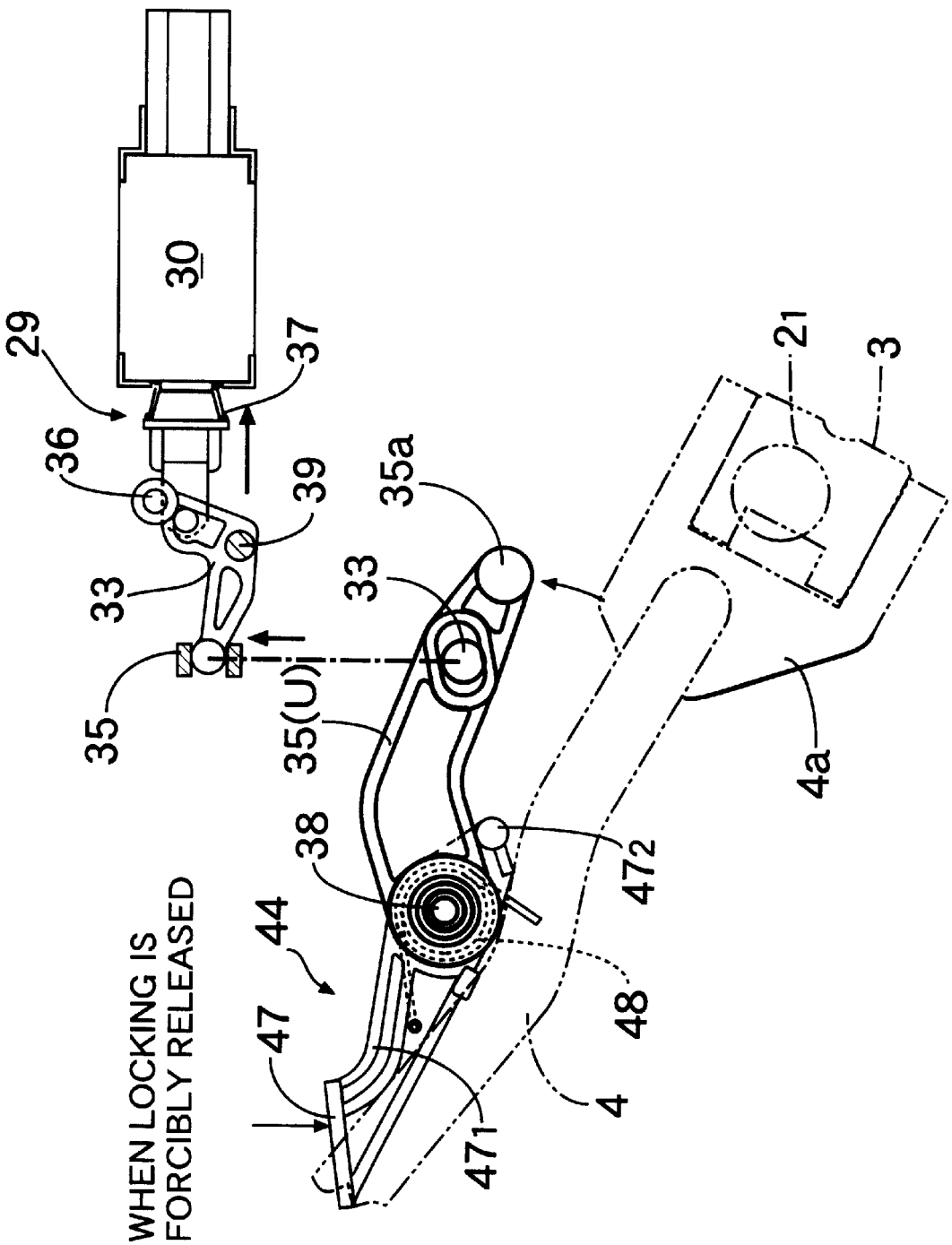

To assemble the column shift device, the joint member 12 is inserted in a single state into the guide groove 14 with its chamfered portions 12$b$ turned toward the arcuate surface of the guide groove 14, as shown in FIG. 11. Then, the joint member 12 is turned through approximately 90°, so that the chamfered portions 12$b$ are turned toward an opened surface of the guide groove 14, whereby the spherical portion thereof is mated with the arcuate surface of the guide groove 14. Thereafter, the arm shaft 5 is fitted into the shaft bore 12$a$. If the operation is conducted in this manner, the joint member 12 cannot leave the guide groove 14, because the returning of the joint member 12 to an angle provided upon insertion thereof in the guide groove 14 is restricted by the arm shaft 5.

A control wire 15 connected to an manual valve (not shown) of an automatic transmission is connected to the second arm $13_2$ of the shift link 13 (see FIG. 4).

As shown in FIG. 1, the shift piece 3 is turned around the first pivot $2_1$ by the shift lever 4 to any of seven shift positions: a parking position P, a reverse position R, the neutral position N, a fourth gear shift drive position $D_4$, a third gear shift drive position $D_3$, a second gear shift holding position II and a first gear shift holding position I. A detent mechanism 17 for retaining the shift lever 4 at any of the shift positions is provided between the bracket 1 and the shift piece 3. This mechanism 17 includes a detent plate 18 flat-shaped about the first pivot $2_1$ and integrally formed on the shift piece 3, and a detent spring 20 secured at its base end to the bracket 1 and having a positioning roller 19 carried at its tip end. Seven V-shaped notches $21_1$, $21_2$, $21_3$, $21_4$, $21_5$, $21_6$ and $21_7$ corresponding to the shift positions P to I of the shift piece 3 are provided around an outer peripheral surface of the detent plate 18, so that the positioning roller 19 is brought into engagement in any of the notches $21_1$ to $21_7$ corresponding to the shift positions of the shift lever 4 by a resilient force of the detent spring 20. Thus, the shift piece 3 and the shift lever 4 can be retained at each of the shift positions, and a feeling of moderation can be provided to an operator.

In addition, as shown in FIG. 5, a shift restraining mechanism 22 for providing a given restraint to the shifting operation of the shift lever 4 is provided between shift lever 4 and the bracket 1. The mechanism 22 includes a limiting plate 23 coupled in a molded manner to the bracket 1, and an engage claw 25 fixedly provided at the base portion of the shift lever 4 to engage a cam surface 26 formed on a radially outer-side inner peripheral edge of a window 23a in the limiting plate 23, which is fan-shaped about the first pivot $2_1$. The cam surface 26 has a P-position maintaining groove 26p, an R-position limiting step 26r, an N-position limiting step 26n, a $D_3$-position limiting step $26_3$, a II-position limiting step $26_2$ and a I-position limiting step $26_1$, which correspond to the positions P, R, N, $D_3$, II and I of the shift lever 4, respectively. The set spring 8 biases the shift lever 4 in a direction to bring the engage claw 25 into engagement with the cam surface 26.

Thus, if the shift lever 4 is turned about the second pivot $2_2$ against the biasing force of the set spring 8 by an operator pulling the knob 4a of the shift lever 4 toward himself, the engage claw 25 is caused to leave the cam surface 26, so that it is released from the limiting action thereof. Therefore, if the shift lever 4 is then turned about the first pivot $2_1$, the shift lever 4 can be shifted to desired one of the shift position P to I attendant with the second pivot $2_2$ and the shift piece 3. During this time, the arm shaft 5 integral with the second pivot $2_2$ swings the shift link 13 through the joint member 12 and hence, the control wire 15 connected to the shift link 13 is pulled or pushed to provide a shift control position corresponding to the shift portion of the shift lever 4 to the manual valve of the automatic transmission.

Figure 15:
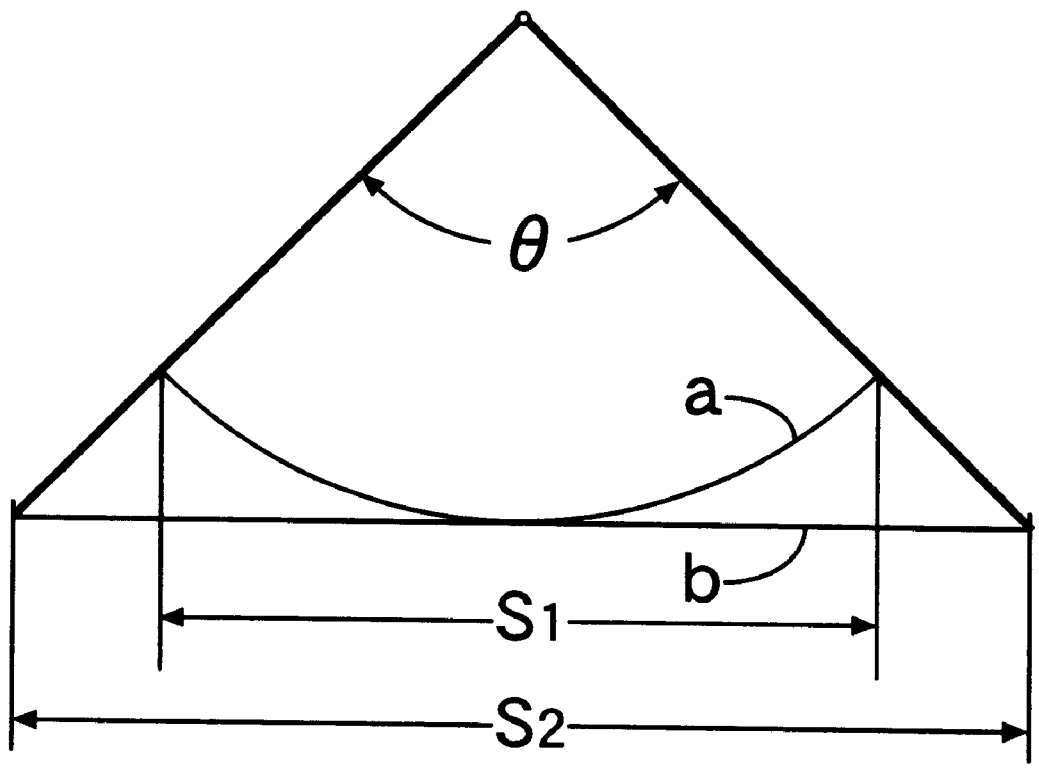
FIG. 15 is a diagram showing the relationship between the turning angle of an arm shaft and the turning stroke of a shift link.

The spherical joint member 12 is slidably fitted over the arm shaft 4 and engaged in the rectilinear guide groove 14 in the shift link 13, and hence, during the turning of the arm shaft 5 about the first pivot $2_1$, the joint member 12 provides the turning of the shift link 13, while being slid on the arm shaft 5 and at the same time, being moved rectilinearly along the guide groove 14. Therefore, if the turning angle θ of the arm shaft 5 is constant, the joint member 12 describes a locus of a straight line b, and the length $S_2$ of the straight line b is equal to a turning stroke provided to the shift link 13, which is a remarkable increase more than the turning stroke $S_1$ of the shift link of the conventional device, as shown in FIG. 15. Thus, it is possible to provide a large shift stroke to the shift valve of the automatic transmission.

The shift piece 3 supporting the shift lever 4 of the large weight and the like is turnably connected to the bracket 1 through the relatively short first pivot $2_1$. However, since the bracket 1 and the shift piece 3 have the turnable/slidable surfaces 1f and 3f of the diameters d several times larger than the effective length s of the first pivot $2_1$, which are in abutment against each other, much of the load applied to the shift piece 3 can be borne not only by the first pivot $2_1$ but also by the rotatable/slidable surfaces 1f and 3f to stably support the shift piece 3 on the bracket 1. Therefore, the inclination of the shift piece 3 can be prevented effectively. At the same time, the column shift device can be made compact by employment of the relatively short first pivot $2_1$.

Moreover, since the thrust plate 10 having the low friction coefficient is interposed between both of the rotatable/slidable surfaces 1f and 3f, the resistance of turning movement between the bracket 1 and the shift piece 3 is extremely small for the reason that the bracket 1 and the shift piece 3 are made of the synthetic resin and hence, the operation of the shift lever 4 can be performed lightly.

As shown in FIGS. 1, 2, 12 and 13, a shift lock mechanism 29 is provided on the bracket 1. When the shift lever 4 assumes the position P, the mechanism 29 locks the shift lever 4 at the position P, unless a brake of the vehicle is operated. The mechanism 29 includes a lock lever 35 which is carried at 38 on one side of the bracket 1 opposed by the boss member 4a of the shift lever 4 for swinging movement between a locking position L (see FIG. 12) and an unlocking position U (see FIG. 13). At the locking position L, when the shift lever 4 assumes the position P, a thicker portion 35a at a tip end of the lock lever 35 is interposed between opposed surfaces of the boss member 4a and the bracket I, so that the turning movement of the shift lever 4 about the second pivot $2_2$ is inhibited. To operate the lock lever 35, an electromagnetic actuator 30 is mounted to an upper surface of the bracket 1, and an operating rod 36 of the electromagnetic actuator 30 is connected to the lock lever 35 through a bell crank 33 carried at 39 on the upper surface of the bracket 1. The electromagnetic actuator 30 is provided with a lock spring 37 adapted to bias the operating rod 36 toward the locking position L of the lock lever 35. The electromagnetic actuator 30 has a solenoid connected to a battery through a braking operation sensing switch (not shown) which is closed in response to the depression of a brake pedal.

When in a state in which the shift lever 4 assumes the position P and the engage claw 25 is in engagement in the P-position maintaining groove 26p, if the brake pedal is in a resting position, the lock lever 35 is retained at the locking position L by a resilient force of the lock spring 37 of the electromagnetic actuator 30, and the turning movement of the shift lever 4 about the first pivot $2_1$ is restricted by the interposition of the thicker portion 35a at the tip end of the lock lever 35 between the opposed faces of the boss member 4a and the bracket 1. As a result, the engage claw 25 cannot be escaped from the P-position maintaining groove 26p and hence, the shift lever 4 cannot be operated.

Thereupon, if the brake pedal is depressed down, the operating rod 36 is pulled by the excitation of the electromagnetic actuator 30, whereby the lock lever 35 is retreated to the unlocking position U. Therefore, the shift lever 4 can be swung about the second pivot $2_2$ to escape the engage claw 25 from the P-position maintaining groove 26p, and the second pivot $2_2$ and the shift piece 3 can be turned to any desired one of the shift positions by the shift lever 4.

On the other hand, when the shift lever 4 is to be turned from the position R to the position P, the electromagnetic actuator 30 is in its de-energized state to retain the lock lever 35 at the locking position L. However, the engage claw 25 pushes the lock lever 35 toward the unlocking position U against the force of the lock spring 37 and hence, the turning movement of the shift lever 4 to the position P is achieved.

If the shift lever 4 brings the engage claw 25 into engagement in the P-position maintaining groove 26*p*, the lock lever 35 is returned again to the locking position L by the resilient force of the lock spring 37 to lock the shift lever 4 again.

Referring again to FIGS. 1, 2 and 12, a forcibly lock-releasing mechanism 44 is connected to the shift lock mechanism 29. The mechanism 44 is adapted to forcibly retreat the lock lever 35 to the unlocking position U by a manual operation, when the electromagnetic actuator 30 is fallen into an inoperable state due to over-charging of the battery or the like. The mechanism 44 includes a releasing lever 47 supported on the bracket 1 by a common pivot 38 along with the lock lever 35. The releasing lever 47 includes a tongue-shaped manipulating portion 47$_1$ formed at one end to extend toward the operator, and an operating portion 47$_2$ formed at the other end and adapted to push up the lock lever 35 to the unlocking position U. A return spring 48 is connected to the releasing lever 47 for biasing the operating portion 47$_2$ away from the lock lever 35.

If the manipulating portion 47$_1$ is urged by an engine key or the like, the releasing lever 47 can be turned to push up the lock lever 35 to the unlocking position U by the operating portion 47$_2$. This ensures that even if the electromagnetic actuator 30 is in its inoperable state, the shift lever 4 can be shifted from the position P to any other desired shift position.

Although the embodiment of the present invention has been described in detail, it will be understood that the present invention is not limited to the above-described embodiment, and various modifications may be made without departing from the spirit and scope of the invention defined in claims. For example, the arm shaft 5 may be separated from the second pivot 2$_2$ and may be secured to the shift piece 3 at a location offset from the axis of the second pivot 2$_2$.

What is claimed is:

1. A column shift device for an automatic transmission, comprising a bracket mounted to a steering column, a shift piece connected to said bracket through a first pivot for turning movement to any of a plurality of shift positions, a shift lever which is connected to said shift piece through a second pivot disposed on a plane substantially perpendicular to said first pivot and which is capable of turning said shift piece through said second pivot, a shift restraining mechanism which is provided on said bracket for engagement and disengagement permitted in response to a swinging movement of said shift lever about said second pivot and adapted to limit a turning movement of said shift lever about said first pivot during engagement of the shift restraining mechanism, and a shift link which is pivoted on said bracket for swinging movement and is operated in association with the turning movement of said shift lever about said first pivot to control the automatic transmission, wherein said column shift device further includes a spherical joint member slidably fitted over an outer periphery of an arm shaft which is fixedly mounted on said shift piece and protrudes outwards of said shift piece, said joint member being slidably put into engagement in a guide groove which is defined in said shift link and extends rectilinearly in a direction intersecting a direction of turning movement of said arm shaft about said first pivot.

2. A column shift device for an automatic transmission according to claim 1, wherein said joint member has a shaft bore provided therein, into which shaft bore said arm shaft is slidably fitted, and chamfered portions provided on opposite sides of said joint member, into which chamfered portions said shaft bore opens, a distance between both said chamfered portions being set slightly smaller than a groove width of said guide groove.

* * * * *